C. J. SPILL

May 13, 1930. LEAK DETECTING APPARATUS Re. 17,662

Original Filed Sept. 4, 1924

INVENTOR :
Charles John Spill,
By Attorneys,
Fraser Myers & Manley

Reissued May 13, 1930

Re. 17,662

UNITED STATES PATENT OFFICE

CHARLES JOHN SPILL, OF FREEPORT, NEW YORK, ASSIGNOR TO A. SCHRADER'S SON, INCORPORATED, OF BROOKLYN, NEW YORK, A CORPORATION OF NEW YORK

LEAK-DETECTING APPARATUS

Original No. 1,592,389, dated July 13, 1926, Serial No. 735,922, filed September 4, 1924. Application for reissue filed June 28, 1928. Serial No. 289,021.

The present invention relates to leak-detecting devices and aims to provide certain improvements therein. More specifically, it has to do with a device for, and the method of, detecting leaks in a valved passage, as for example, a pneumatic tire valve which comprises a casing having a passage therethrough and a valve inside within said casing. The valve inside usually comprises a valve seat having a packing adapted to seat against a shoulder within the casing, and a valve proper having a packing adapted to engage the valve seat. Defects in either of said packings or in other elements of the tire valve may render the tire valve unfit for use, and in order to guard against such defective valves reaching the market, the present invention has been devised.

In its simplest embodiment, the invention consists of a disconnected fluid conduit between the intermediate ends of which the tire valve may be connected; one end of said conduit being connected with a source of fluid pressure or suction and the other end being connected to means adapted to indicate the flow of fluid through the conduit.

A specific embodiment of my invention is illustrated in the accompanying drawings, wherein.

Figures 1, 2:
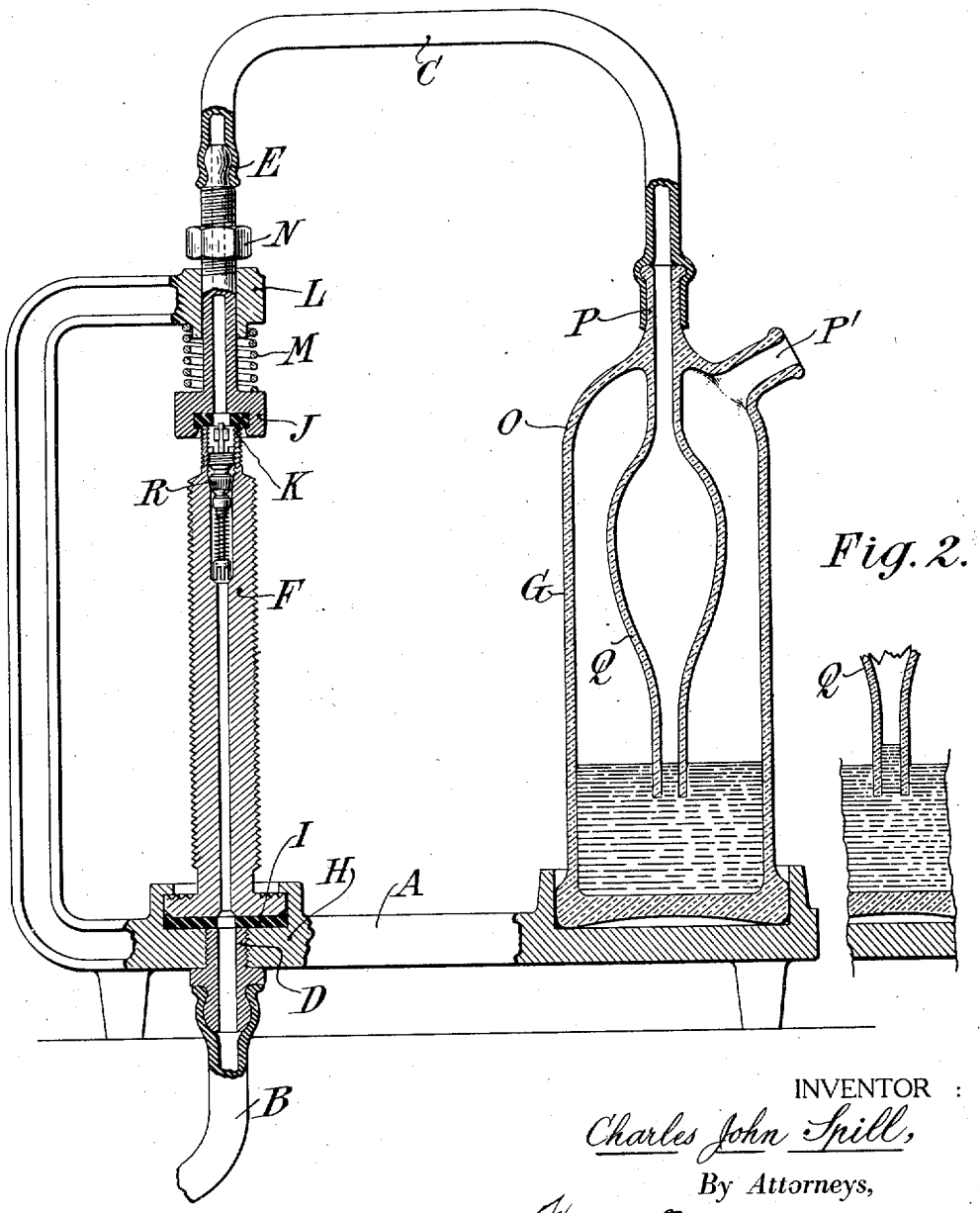
Figure 1 shows a front elevation of the apparatus, parts thereof being shown in section.
Fig. 2 is a fragmentary sectional view of the indicating means in indicating position.

Referring to the drawings, let A indicate a suitable stand or support for the apparatus which in its essential elements consists of a disconnected fluid conduit B, C, the intermediate ends D, E, of which are adapted to receive therebetween a member having a valved passage, herein shown as a pneumatic tire valve F and an indicating means G. The branch B of the fluid conduit is connected at one end to a source of fluid pressure or suction (not shown) and at its other end to a member H having a seating face carrying a packing gasket I. The branch C of the fluid circuit is connected at one end to the indicating device G and at its other end to a movable member J having a seating face provided with a packing K, the member J being longitudinally slidable through an opening in an arm L of the support A and normally urged inwardly by a spring M positioned between the member L and the head of the member J. The inward movement of the member J is limited by a nut N adjustably positioned on a screw-threaded portion of the member J.

The indicating means capable of use in the present apparatus may be of any preferred form, but I have herein shown the device G as consisting of a transparent bottle-like member O having a neck P connected to one end of the circuit C, a second neck-like portion P′ exposing the interior of the member O to atmospheric pressure, and extending inwardly into the bottle from the neck P is a transparent tubular portion Q which is enlarged intermediate its ends for a purpose which will hereinafter appear. The free end of the tubular portion Q dips below the surface of liquid, which is preferably colored, within the member O.

The member having a valved passage which is adapted to be connected to the intermediate ends of the disconnected conduit may be of any form whatever, and as herein shown is a pneumatic tire valve having a valve inside R of standard construction. A detailed description of such valve appears in U. S. Letters Patent No. 1,171,147, February 8, 1916. The present invention is primarily intended for detecting defects in the valve inside construction which give rise to leakage of air past the valve check when the tire valve is in use.

The method of detecting leaks in the valved member such as pneumatic tire valves is as follows:

The free end of the branch B is connected to a source of fluid pressure or suction and the tire valve is then connected between the seats H and J, a leak-tight seal being provided at these points through the medium of the packings I and J and the action of the spring M. If the valve inside R is defective or if for any other reason it does not provide a fluid-tight passage through the valve casing, then there will be an indication of such leak in the member G. If B is connected to a source of fluid pressure then bubbles will be seen arising through the liquid outside the free end of the tube Q. On the other hand, if B is connected to a source of suction then air will be extracted from the tube Q, causing the liquid to rise therein. The enlargement in the tube Q is for the purpose of preventing the liquid being sucked completely through the apparatus; for it will be obvious that in view of the limited extent to which the free end of the tube Q is immersed in the liquid, that but a limited quantity of such liquid can be drawn into the tube. In employing suction I have found the device to be extremely sensitive in detecting what are known as slow leaks in tire valves, and further by employing a colored liquid, the indication or extent to which the liquid rises in the tube Q renders this detection more facile.

It will be understood that the invention in its broad aspect comprises the method of and apparatus for testing valves having a spring-seated check valve member by establishing on opposite sides of said valve check member a fluid pressure differential with the higher pressure acting in the direction of opening of said valve check member, said higher pressure being insufficient to overcome the force of the valve check member seating spring to unseat the valve check member and utilizing the passage of fluid through the valve, if any, to indicate a defect in the valve.

While I have shown and described a single embodiment of my invention, it will be understood that I do not wish to be limited to the precise structure disclosed, as various changes may be made therein without departing from the spirit of the invention.

What I claim is:

1. A device of the kind described, comprising a pair of aligned spaced seats one of which is movable longitudinally with respect to the other and urged toward said other by spring means, said seats being adapted to receive therebetween a pneumatic tire valve, each of said seats having a passage therethrough, one of said seats being adapted for connection to a source of fluid pressure or suction and the other seat being connected to a pressure-indicating device.

2. A device of the kind described, comprising a disconnected fluid conduit adapted to receive between the intermediate ends thereof to complete the conduit, a member having a valved passage, one end of said conduit being adapted for connection to a source of fluid suction and the other end to a transparent tube partially filled with a liquid.

3. A device of the kind described, comprising a disconnected fluid conduit adapted to receive between the intermediate ends thereof to complete the conduit, a pneumatic tire valve, one end of said conduit being adapted for connection to a source of fluid suction and the other end to a transparent tube partially filled with a colored liquid.

4. A device of the kind described for detecting leaks in a pneumatic tire valve when disconnected from a tire, which comprises a two part conduit between the adjacent ends of which the pneumatic tire valve is adapted to be connected, one end of the conduit being adapted for connection to a source of fluid suction, and the other end, to means adapted to indicate the passage of fluid through the tire valve due to the suction action at the first mentioned end of the valve casing if the pneumatic tire valve is defective.

5. A device of the kind described for detecting leaks in a pneumatic tire valve when disconnected from a tire, which comprises a two part conduit between the adjacent ends of which the penumatic tire valve is adapted to be connected, one end of the conduit being adapted for connection to a source of fluid suction, and the other end, to means adapted to visually indicate the passage of fluid through the tire valve due to the suction action at the first mentioned end of the valve casing if the penumatic tire valve is defective.

6. A device of the kind described, comprising a disconnected fluid conduit adapted to receive between the intermediate ends thereof to complete the conduit, a member having a valved passage, one end of said conduit being connected to a source of fluid suction and the other end to a transparent tube partially filled with a liquid, said tube having an enlarged portion above its liquid containing portion, and said enlarged portion being adapted to function as a check reservoir to prevent the liquid being sucked through the completed conduit.

7. A device for detecting leaks in a valved member having a spring-seated valve check therein comprising means for holding the valved member, means for establishing on the opposite sides of the spring seated valve check a fluid pressure differential with the higher pressure acting in the direction of opening of the valve check, and indicating indicia operable by the leakage of fluid through the valve, if any.

8. A device for detecting leaks in a valved member having a spring-seated valve check therein comprising means for holding the valved member, means for establishing on the opposite sides of the spring seated valve check a fluid pressure differential with the higher pressure acting in the direction of opening of the valve check, said higher pressure being insufficient to overcome the force of the valve check seating spring, and indicating indicia operable by the leakage of fluid through the valve, if any.

9. A device for detecting leaks in a valved member having a spring-seated valve check therein comprising means for holding the valved member, means for establishing on the opposite sides of the spring seated valve check a fluid pressure differential with the higher pressure acting in the direction of opening of the valve check, and means for indicating the leakage of fluid through the valve, if any, when subjected to such differential fluid pressure.

10. A device for detecting leaks in a valved member having a spring-seated valve check therein which comprises means for holding the valved member, means for reducing the atmospheric pressure acting on the side of the valve check upon which the force of the spring is effective, and means for indicating the leakage of fluid through the valve, if any, under such conditions, said means being operable by the passage of the fluid.

11. The method of testing a valve having a spring-seated valve check member therein which comprises establishing on opposite sides of the valve check member a slight fluid pressure differential with the higher pressure acting in the direction of opening of the valve check member, and utilizing the passage of fluid through the valve, if any, to produce an indication of a defect in the valve.

12. The method of testing a valve having a spring-seated valve check member therein which comprises establishing and maintaining on opposite sides of the valve check member a slight fluid pressure differential with the higher pressure acting in the direction of opening of the valve check member, and utilizing the passage of fluid through the valve, if any, to produce an indication of a defect in the valve.

13. The method of testing a valve having a spring-seated valve check member therein which comprises reducing the atmospheric pressure on the side of the valve check member upon which the force of the spring is effective and utilizing the passage of fluid through the valve, if any, to produce an indication of a defect in the valve.

14. The method of testing a valve having a spring-seated valve check member therein, which comprises increasing the effective fluid pressure on the valve check member in the direction of opening of said valve check member, said pressure being insufficient to overcome the force of the valve check member seating spring, and utilizing the passage of fluid through the valve, if any, to produce an indication of a defect in the valve.

In witness whereof, I have hereunto signed my name.

CHARLES JOHN SPILL.